United States Patent Office 3,159,547
Patented Dec. 1, 1964

3,159,547
METHOD OF LOWERING BLOOD PRESSURE WITH 4-(2-AMINO - 4 - PYRIMIDYLAMINO)-BENZENE-SULFONAMIDE
Hollis George Schoepke, Waukegan, and James Harold Short, Lake Forest, Ill., assignors to Abbott Laboratories, North Chicago, Ill., a corporation of Illinois
No Drawing. Filed June 28, 1963, Ser. No. 291,288
6 Claims. (Cl. 167—51.5)

The present invention relates to a method of counteracting hypertension by the administration to warm-blooded animals of a composition containing 4-(2-amino-4-pyrimidylamino)-benzenesulfonamide of the formula

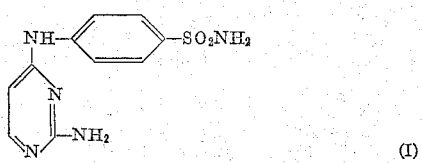

or non-toxic, pharmaceutically acceptable, acid-addition salts thereof, such as the hydrochloride, hydrobromide, phosphate, sulfate, acetate, citrate, tartrate, benzoate, salicylate, glycolate, succinate, nicotinate, ascorbate, maleate, lactate and the like.

The compound of Formula I melts at 240° C. and can be readily prepared as described in J.A.C.S., 63, 3234 (1941). The hydrochloride which melts at 281° C. is prepared by the reaction of equimolecular proportions of the free base and hydrochloric acid in an alcoholic medium at room temperature. Upon evaporation of the alcohol and recrystallization of the residue, the hydrochloride is obtained as a white, crystalline solid. Similarly, other acid-addition salts can be prepared by the reaction of the base with such acids as those previously enumerated.

This invention is predicated upon the discovery that when 4-(2-amino-4-pyrimidylamino)-benzenesulfonamide or its acid-addition salts are combined with solid or liquid pharmaceutical carriers and administered orally or parenterally to hypertensive animals, there is an immediate and prolonged drop in blood pressure. Representative formulations and the results obtained by their use are more fully set forth in the following examples.

Example 1

Mix 60 grams of 4-(2-amino-4-pyrimidylamino)-benzenesulfonamide with 260.72 grams of milk sugar and pass the mixture through a 30 mesh screen. Dissolve 4.80 grams of acacia in 24 ml. of water and add the resulting solution to the mixture first prepared. Granulate the wet mass through a 6 mesh screen, dry the granulation at 50° C. overnight and grind the dried granulation to 20 mesh. Add 38.4 grams of corn starch, 10.52 grams of talc and 6.56 grams of stearic acid to the dried granulation, pass through a 40 mesh screen, mix thoroughly and compress into tablets containing 25 mg. each of the benzenesulfonamide compound.

Example 2

Mix 25 grams of 4-(2-amino-4-pyrimidylamino)-benzenesulfonamide phosphate with 273.5 grams of lactose and blend with 1.5 grams of magnesium stearate. Fill hard gelatin capsules with 300 mg. each of the blended mixture to produce capsules containing 25 mg. of the benzenesulfonamide phosphate compound.

Example 3

Dissolve 10.95 grams of 4-(2-amino-4-pyrimidylamino)-benzenesulfonamide hydrochloride and 6 grams of monopotassium phosphate in 800 ml. of sterile water and filter. Then add enough sterile water to make one liter of solution. Aseptically fill one ml. portion of the solution into 2 ml. vials and lyophilize so that each vial will contain 10 mg. of the benzenesulfonamide hydrochloride. Stopper the vials with rubber plugs and seal.

Example 4

Several cats were anesthetized with pentobarbital and their blood pressure was recorded. The cats were then divided into groups and various dosages of 4-(2-amino-4 - pyrimidylamino) - benzenesulfonamide hydrochloride dissolved in aqueous, saline solution were injected into the femoral vein of the cats in each group. It was found that of 14 cats given a dose of 10 mg./kg., the mean drop in blood pressure was 24 mm. Hg which was sustained for an average of 42 minutes. Ten other cats administered a dose of 20 mg./kg. showed a mean drop in blood pressure of 33 mm. Hg which was sustained for an average of 75 minutes. The minimal effective dose to attain a significant fall in blood pressure was 5 mg./kg.

Example 5

A group of dogs with artificially induced neurogenic hypertension and another group of dogs with artificially induced renal hypertension were orally administered various doses of 4-(2-amino-4-pyrimidylamino)-benzenesulfonamide hydrochloride in capsule form and the subsequent drop in blood pressure was recorded. In the neurogenic dogs, it was found that the minimal effective dose was 30 mg./kg. whereas a dose of 60 mg./kg. reduced the mean arterial blood pressure from 210 mm. Hg to 155 mm. Hg which was sustained from 4 to 24 hours. The minimal effective dose in the renal hypertensive dogs was 50 mg./kg. and at 60 mg./kg., the mean blood pressure was reduced from 185 mm. Hg to 155 mm. Hg for a period of from 4 to 6 hours.

Similar results are obtained when intravenous doses of from 5 to 20 mg./kg. or oral doses of from 30 to 60 mg./kg. of 4-(2-amino - 4 - pyrimidylamino)-benzenesulfonamide per se or any of its other non-toxic, acid-addition salts are administered to hypertensive, warm-blooded animals.

We claim:
1. A method of lowering blood pressure in a warm-blooded animal which comprises administering a composition containing a compound selected from the group consisting of 4-(2-amino-4-pyrimidylamino)-benzenesulfonamide and pharmaceutically acceptable, acid-addition salts thereof.
2. A method as claimed in claim 1 in which the composition is administered intravenously.
3. A method as claimed in claim 1 in which the composition is administered orally.
4. A method as claimed in claim 1 in which a composition containing a pharmaceutically acceptable, acid-addition salt of 4-(2-amino-4-pyrimidylamino)-benzenesulfonamide is administered intravenously.
5. A method as claimed in claim 4 in which the acid-addition salt employed in the composition is the hydrochloride.
6. A method as claimed in claim 5 in which the composition is administered orally in capsule form.

References Cited in the file of this patent

Suto-Nagy: Chem. Abst., vol. 36, 1942, pp. 425–426, P.O.S.L.
Northey: The Sulfonamides, Reinhold, 1948, pp. 113–114.